United States Patent [19]

Le et al.

[11] Patent Number: 4,650,225

[45] Date of Patent: Mar. 17, 1987

[54] HYDRAULIC HOLDDOWN SCREW WITH MECHANICAL RETENTION MEANS

[75] Inventors: Tri C. Le, Missouri; F. Harold Hollister, Richmond, both of Tex.

[73] Assignee: Joy Manufacturing Company, Pittsburgh, Pa.

[21] Appl. No.: 846,172

[22] Filed: Mar. 31, 1986

[51] Int. Cl.$^4$ .............................................. F16L 19/00
[52] U.S. Cl. .................................... 285/348; 285/351; 285/145; 285/146; 285/920
[58] Field of Search ............... 285/348, 351, 144, 145, 285/146, 139, 141, 920

[56] References Cited

U.S. PATENT DOCUMENTS 3,017,931  1/1962  Jackson et al. ................. 285/144 X
3,334,924  8/1967  Todd .............................. 285/145 X Primary Examiner—Richard J. Scanlan, Jr.
Attorney, Agent, or Firm—Marvin J. Marnock

[57] ABSTRACT

A holddown screw assembly 10 which features a shaft 33, an energizer screw 39 and a detachable contact nose 20 adapted to be assembled in coaxial alignment in a radial bore in a wellhead structure. The shaft is provided with a passage 40 extending from its outer end as the holddown screw is normally used in a wellhead installation to a cross passage 41 at the other end of the shaft. Also, at its outer end, a fitting 32 is attached to facilitate connection to a hydraulic supply line 28. An annular bearing flange 35 is provided on the shaft near its outer end. A packing nut 31 and a set of packing rings 34 are sleeved about the shaft 33 with the nut disposed in abutting relation to the bearing flange 35 where it is held fixed but rotatable thereagainst by means 36. The packing nut is threaded into a threaded section of a bore 11 such as may be provided in the flange 12 of a casing spool 13. By turning the packing nut, the packing ring set may be compressed against a shoulder 37 in the bore 11. The energizer screw is also threaded into a threaded section of the bore 11 and is provided with passage means 44 extending in the axial direction therethrough. The contact nose 20 is attached to the energizer screw 39 in a manner which premits a limited axial movement of the contact nose relative to the shaft 33. Accordingly, hydraulic pressure communicated to the outer end of the holddown screw 10 will be communicated through the shaft 33 and energizer screw 39 to be applied against the contact nose 20 to drive it against the object to be held down or seal assembly 14 to be energized. By communication of hydraulic pressure to a plurality of such screws, the screws 10 may be energized simultaneously. For each holddown screw 10 a mechanical connection is provided between the shaft 33 and energizer screw 39 whereby axial rotation of the shaft 33 will effect the threaded advancement of the energizer screw to drive the contact nose and thereby effect a mechanical actuation of the holddown screw. This capability is available as an alternative to hydraulic means of energizing the holddown screw 10 and also as a means for mechanically retaining the preload after it has been applied hydraulically.

3 Claims, 6 Drawing Figures

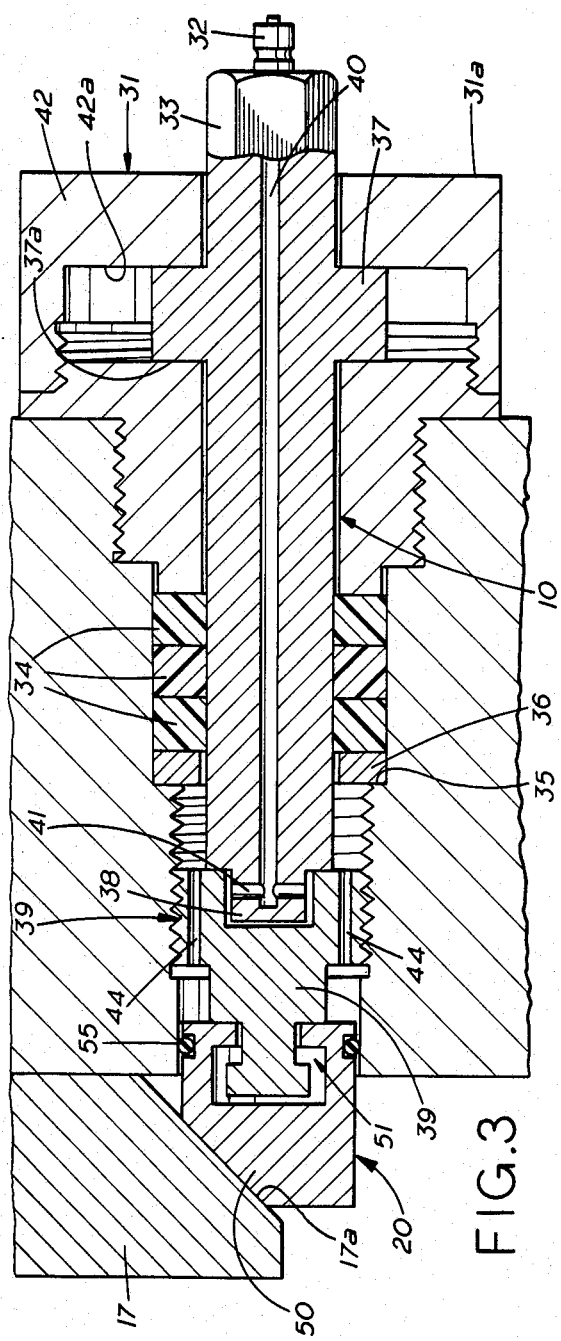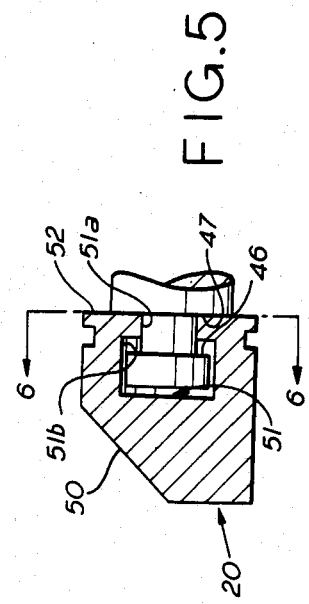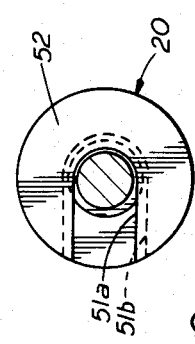
FIG. 3
FIG. 5
FIG. 6

HYDRAULIC HOLDDOWN SCREW WITH MECHANICAL RETENTION MEANS

BACKGROUND OF THE INVENTION

This invention relates generally to actuating screws and more particularly to a holddown lock screw as is commonly used in pressurized wellhead structures for such functions as holding down a casing or tubing hanger mounted in the wellhead or for energizing a pack-off seal or any of a variety of wellhead seal devices.

In a typical wellhead structure, one or more concentrically disposed casing strings are suspended from casing hangers which are supported within the bore of a casing head member. A hanger bowl lowered into the wellhead provides support for a tubing hanger which receives one or more tubing strings extending down into the well within the innermost casing string.

The hangers are normally held down by a plurality of holddown screws which are threaded into the wellhead and against camming surfaces of the hangers in order to urge these components downwardly and prevent their blowout from the well. In other applications, holddown screws are used to provide a preload for energizing pack-offs or other wellhead seal devices. Typically, a plurality of holddown screws are arranged with equiangular spacing in co-planar disposition about the wellhead and the object to be held down or energized. Each of the screws is adapted to be moved axially in a radial direction towards the longitudinal axis of the wellhead bore. With existing designs this is accomplished mechanically whereby the torque applied by a wrench to the screw shaft is converted into thrust by means of screw threads. Since a number of screws are employed, torque must be applied to the screws alternately and incrementally. This procedure is time consuming, difficult and usually requires at least two persons and the use of a long "cheater" bar. If the torque is not applied evenly in an alternate manner to each of the holddown screws and in small enough increments the hanger to be held down or seal to be energized will "cock". Then, regardless of the amount of subsequent load applied the seal cannot be brought back parallel. As a result the sealing surfaces will not contact and leakage will result. If this happens the sealing surfaces may also be damaged so that replacement of the seal is necessary. This problem is maximized with metallic seals.

It is therefore a primary object of the invention to provide a holddown screw assembly which may be energized hydraulically or mechanically and in an application employing a plurality of holddown screws may be energized simultaneously in concert with each of the other holddown screws whereby each of the screws evenly applies a load to the seal to be energized.

It is another object to provide a holddown screw which may be energized by hydraulic means and then mechanically retained to permit removal of the hydraulic means.

It is a further object of the invention to provide a holddown screw assembly of a plurality of holddown screws arranged in co-planar equiangular spacing about an object to be actuated or energized wherein the plurality of screws may be energized simultaneously by hydraulic means and then mechanically retained.

SUMMARY OF THE INVENTION

The invention is a holddown screw assembly which features an elongate shaft, an energizer screw and a detachable contact nose assembled together in coaxial alignment. The shaft is provided with a longitudinal passage extending from its outer end as the holddown screw is normally used in a wellhead installation to a cross passage at the other end of the shaft. Also, at its outer end, a fitting is attached to facilitate its connection to a hydraulic fluid supply line whereby pressurized fluid may be communicated through the passages of the shaft. An annular radial flange is provided on the shaft near its outer end. A packing gland nut and a set of packing rings are sleeved about the shaft with the nut disposed in abutting relation to the annular flange. The packing nut is provided with external threads whereby it may be threaded into an internally threaded section of a bore such as may be provided in the flange of a casing spool. By turning the packing nut, the packing ring set may be compressed against an annular shoulder in the bore which receives the holddown screw. The energizer screw is also threaded into a threaded section of the bore and is provided with a passage extending in the axial direction therethrough. The contact nose is attached to the energizer screw in a manner which permits a limited range of axial movement.

Accordingly, hydraulic pressure communicated to the outer end of the holddown screw will be communicated through the passages in the shaft and energizer screw and against the contact nose to drive it against the object to be held down or seal assembly to be energized. By communication of the hydraulic pressure to a plurality of such screws in a typical installation, the screws may be energized instantly and simultaneously.

For each holddown screw a mechanical connection is provided between the shaft and energizer screw whereby axial rotation of the shaft will effect the threaded advancement of the energizer screw to drive the contact nose and thereby effect a mechanical actuation of the holddown screw. This capability is available as an alternative to hydraulic means of energizing the holddown screw and also as a means for mechanically retaining the preload which has been applied hydraulically.

BRIEF DESCRIPTION OF THE DRAWINGS

In the accompanying drawings which form part of the specification and are to be read in conjuction therewith:

FIG. 3 is an enlarged view of the holddown screw of FIG. 2 but showing the screw as it appears when being mechanically actuated;

FIG. 4 is an exploded perspective view of the holddown screw of the invention showing details of the contact nose of the screw and the end of the screw shaft which is adapted to engage therewith;

FIG. 5 is a fragmentary view of the contact nose end of the holddown screw of FIG. 2 showing the contact nose in vertical section; and FIG. 6 is an end view of the contact nose as taken along the section line 6—6 in FIG. 5.

Figure 1:
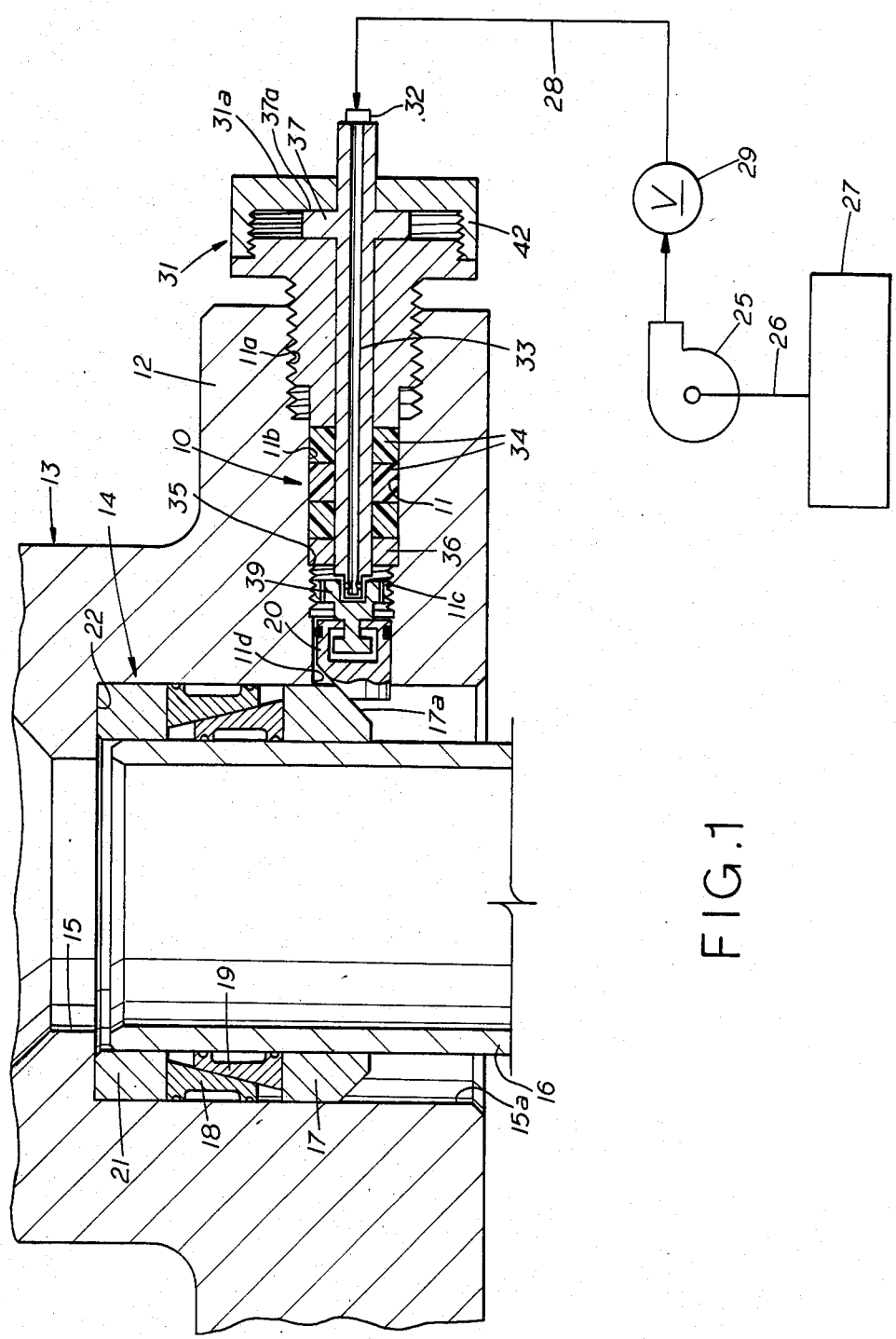
FIG. 1 is a vertical sectional view of the lower end of a casing spool in a wellhead structure showing the holddown screw of this invention in a typical application of providing an energizing force for a crossover seal disposed in an axial bore of the casing spool in surrounding relation to a casing segment for sealing therebetween.
Figure 2:
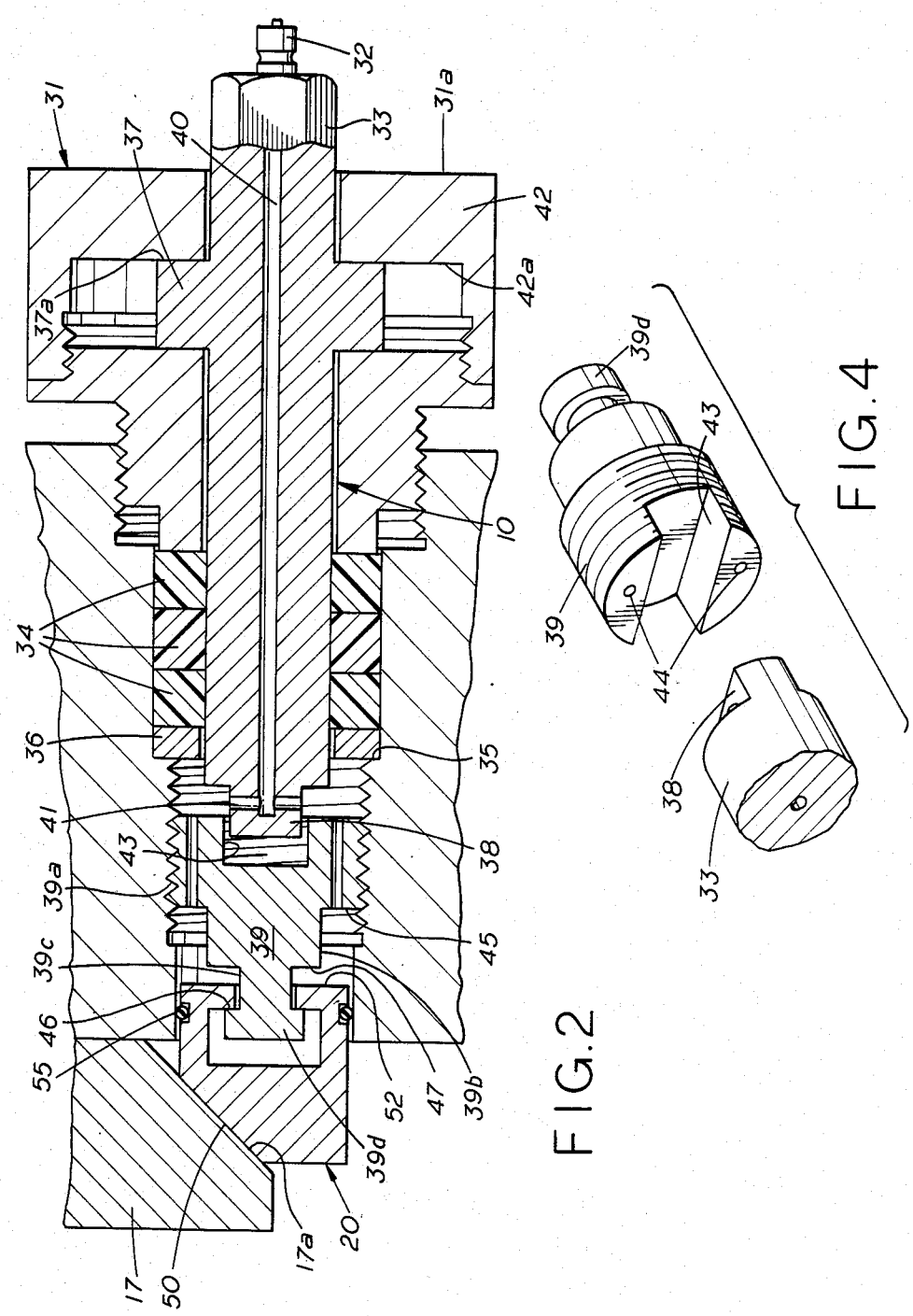
FIG. 2 is an enlarged view of the holddown screw of the invention showing the screw when hydraulically actuated with parts thereof in section, to show details of construction.

Referring to the drawings in greater detail, there is shown in FIG. 1 a preferred embodiment of the holddown screw 10 of this invention wherein the screw 10 is threaded into a radial bore 11 provided in the lower flange 12 of a casing spool 13 for energizing a crossover seal assembly 14. The casing spool 13 which seats atop a casing head (not shown) and is bolted thereon is provided with an axial bore 15 extending therethrough and having an enlarged counterbore section 15a at its lower end. The counterbore 15a receives the upper end of a segment of casing 16 and the crossover seal assembly 14 is disposed in the counterbore 15a in surrounding relation to the casing 16 for sealing the annulus between the casing and the cylindrical wall which defines this counterbore 15a. As is well known, the purpose of the crossover seal is to isolate the high pressure fluids within the casing or tubing head from the higher pressure fluids within the casing string.

In the application illustrated in FIG. 1 the contact nose 20 of the holddown screw 10 engages the energizer ring 17 which is the lower member of the seal assembly 14 and urges it upward to apply an axial preload force to the seal assembly 14. For practical purposes, it is well known in the art, that a plurality of holddown screws are used to energize a pack-off or seal assembly. Conventionally, the holddown screws are oriented in equi-angular spacing about the circumference of the casing spool flange and each is adapted to contact the energizer ring 17 in the manner shown in FIG. 1.

Since the spacer ring 21 which is the upper member of the seal assembly 14 is restricted in upward movement by the annular shoulder 22 defined by the counterbore 15a, the metal seal rings 18 and 19 of the seal assembly 14 as urged by the holddown screws and energizer ring 17 are tightly wedged into metal-to-metal sealing relationship with each other as well as the outer wall of casing 16 and the cylindrical wall of the counterbore 15a. A more detailed description of the crossover seal assembly 14 is provided in U.S. Pat. No. 4,556,224.

As previously stated, the energization of a wellhead seal such as the seal assembly 14, requires a plurality of holddown screws to apply the preload to the seal assembly. These are arranged circularly about the casing 16 with their longitudinal axes in co-planar relationship normal to the axis of the casing spool and being equiangularly spaced thereabout. To accomplish a simultaneous actuation of each of the holddown screws 10, hydraulic pressure is applied against the contact noses 20 to drive them against the contact surface 17a of the energizer ring 17. A pump 25 which receives hydraulic fluid from a reservoir 27 by means of conduit 26 delivers pressurized fluid through a conduit 28 to a port in the outer end 30 of the holddown screw 10. An on-off valve 29 is installed in the conduit 28. By means of a common manifold or a plurality of branches of the conduit 28 interconnecting with the outer ends of as many of the holddown screws as are employed, the hydraulic pressure is simultaneously communicated to each of the holddown screws 10. By means of fluid passages provided in the holddown screw, the hydraulic pressure communicated to the outer end of the screw is applied to the contact nose 20 to drive it inwardly against the energizer ring 17. Connection of the conduit 28 to the outer end of the holddown screw may be by any suitable fitting 32.

As is customary to prevent leakage of well fluids through the opening provided by the radial bore 11 in the casing spool flange 12, a packing gland nut 31 is threaded into the outer section 11a of the flange bore 11 around the shank or shaft 33 of the holddown screw 10 to activate a set of packing rings 34 in smooth bore section 11b and which are compressed between the packing gland nut 31, and a packing ring retainer 36 seated against an annular radial shoulder 35 formed in the bore 11 to establish a seal between the screw 10 and the wall of the bore 11.

The details of construction of the holddown screw 10 are shown in FIGS. 2 through 6. As will be seen therein, the holddown screw 10 includes the elongate shaft member 33 to which the end fitting 32 is attached at the end of the shaft which is its outer end as the holddown screw is normally employed. At its other end, the shaft 33 is provided with a "T-head" or tenon 38 which projects from the shaft in the axial direction thereof and is adapted to cooperate with a T-slot 43 in an energizer screw 39 to be hereinafter described. A longitudinal passage 40 is provided in the shaft 33 which extends along the axis of the shaft from the end with fitting 32 to a cross passage 41 formed in the projection 38 at right angles to the axis of the shaft and opening at the sides thereof.

The shaft 33 is also provided with an annular radial bearing flange 37 near the outer end of the shaft which is disposed to abut the energizer screw 39. An end cap 42 having a central opening 43 is also sleeved about the outer end of the shaft and threaded onto an externally threaded portion of the enlarged head 31a of the packing nut 31. The end cap 42 is threaded onto the packing nut to the extent the inside surface 42a of the cap abuts the outer surface 37a of the bearing flange 37 and thereby locks the shaft 33 to the packing nut 31 in fixed axial position thereon but permitting rotation of the shaft 33 within the energizer screw.

The energizer screw 39 is threaded into a reduced diameter threaded section 11c of the bore 11 and is therefore in coaxial alignment with the shaft 33. The slot 43 which extends diametrically across the face of the energizer screw is disposed towards the end of shaft 33. The width of the slot 43 is of a dimension sufficient to accommodate the projecting "T-head" 38 on the end of shaft 33. Also provided in the energizer screw 39 are passages 44 which extend in the axial direction of the screw to permit fluid communication across the screw when it is installed in the bore 11c.

The end portion of the energizer screw 39 remote from the slotted end facing the shaft 33 is constructed and adapted to carry the contact nose 20 thereon. This end portion of the energizer screw is provided with a circumferential annular groove which defines a reduced diameter section 39c of the energizer screw intermediate a larger diameter radial flange 39d at its distal end and a still larger smooth wall diameter section 39b. The section 39b adjoins the externally threaded section 39a of largest diameter which threads into the radial bore section 11c and defines therewith an annular shoulder 45. Annular shoulders 46 and 47 are also formed by the annular groove at the junction of reduced diameter section 39c with flange 39d and intermediate section 39b respectively.

The contact nose 20 is of cylindrical exterior configuration but provided at its distal end with a flat bevelled surface 50 at a selected angle to its longitudinal axis. Preferably, the bevelled surface extends from a diameter of the cylindrical contact nose as seen in radial cross section. The contact nose 20 is also provided with a slot or recess 51 which extends from the blunt end 52 of the contact nose 20 remote from the distal end to substantially half the length of the contact nose.

As viewed along the longitudinal axis of the contact nose, the recess 51 includes a narrow portion 51a of width sufficient to accommodate the reduced diameter section 39c of shaft 33 and a larger wider portion 51b which is provided with a dimension in the direction of the longitudinal axis of the contact nose which is slightly larger than the axial dimension of the flange 39d on the distal end of shaft 33. Accordingly, the slot portion 51b is able to receive the flange 39d therein and the slightly larger axial dimension of the slot permits a limited axial movement of the contact nose on the shaft 33.

The recess 51 also opens at the cylindrical side surface of the contact nose 20 and extends inwardly therefrom a depth sufficient to accommodate the flange 39d whereby the contact nose 20, energizer screw 39 and shaft 33 are disposed in coaxial alignment.

A circumferential annular groove is also formed about the cylindrical surface of the contact nose 20 adjacent the end 52 of the contact nose 20 and accommodates an o-ring 55 therein which establishes a fluid-tight seal between the contact nose 20 and the wall of the smooth bore section 11d at the inner end of the bore 11.

For operational purposes, as previously stated, the packing nut 31 is threaded into the bore 11c a sufficient distance to energize the packing gland assembly comprising the packing rings 34 whereby the packing rings seal the bore 11. The energizer screw 39, with contact nose 20 attached, is installed first within a threaded section 11c of the bore 11 but is so located that the projection 38 of the shaft 33 is received within the T-slot 43 of the energizer ring as the packing nut 31 energizes the packing rings 34. This spatial relationship between the shaft 33 and the energizer screw 39 is necessary to permit an operational T-slot connection between the energizer screw 39 and shaft 33 whereby merely turning the shaft 33 within the packing nut 31 will effect an advancement of the energizer screw and the contact nose 20.

The principal and preferred operation of the holddown screw 10 is by hydraulic means. By the connection of a hydraulic line to the fitting 32 at the outer end of the holddown screw 10, hydraulic pressure may be communicated through the passages 40 and 41 of the shaft 33 into the annular chamber formed by the volume of the section 11c of the bore 11 intermediate the packing retainer ring 36 and the energizer screw 39. The pressurized hydraulic fluid is then delivered through the passages 44 into the annular chamber formed between the shoulder 45 of the energizer screw and the blunt end 52 of the contact nose 20 to thereby drive the contact nose away from the shoulder 47 of the energizer screw 39 to where the bevelled planar camming surface 50 of the contact nose engages the camming surface 17a of the energizer ring 17 of the crossover seal assembly 14 to apply an axial compression load thereon.

It will therefore be seen that there is no rotation of the contact nose 20 on the camming surface 17a but only sliding contact therewith. Accordingly, the contact stresses therebetween are less than there would be if there were rotary contact and the susceptibility of the mating surfaces to galling is greatly reduced. Also, the application of hydraulic pressure to the end fitting 32 of the holddown screw 10 results in substantially instantaneous energization of the holddown screw and actuation of the wellhead component to be held down or energized. In the typical installation involving a plurality of holddown screws 10, all of the holddown screws are simultaneously energized whereby each applies an equal loading on the wellhead component. This eliminates the tedious, time-consuming and difficult procedure associated with a mechanical energization of the holddown screws wherein each must be "torqued" in an alternate manner by very small increments.

It is also to be noted that once hydraulic energization of the holddown screw 10 has been accomplished, it becomes desirable that the energization be retained by mechanical means in order that the hydraulic pressure may be removed or in the event there be a subsequent failure of the hydraulic pressure. Accordingly, it is only necessary to turn the shaft 33 which requires little effort and by means of the T-slot connection between the shaft 33 and energizer screw 39, thread the energizer screw along the bore section 11c to where its shoulder 47 engages the end 52 of the contact nose 20. Since the contact area of the surfaces 52 and 47 is relatively large, there is little likelihood of galling therebetween. In any event, the energizer screw thereby clamps and retains the contact nose 20 against the camming surface 17a of the crossover seal assembly such that the hydraulic pressurization of the contact nose is no longer necessary.

It is also to be understood that the foregoing description of a preferred embodiment of the invention has been presented for purposes of illustration and description and is not intended to limit the invention to the precise form disclosed. For example, the camming surface 50 of the contact nose might be made to conform precisely with the cooperating camming surface 17a of the object to be actuated. Thrust bearings might also be put on this shaft flange 37 to facilitate shaft rotation. The connections between the contact nose and energizer screw and screw shaft might also differ from the precise form disclosed so long as the functions are retained. It is to be appreciated therefore that changes may be made by those skilled in the art without departing from the spirit of the invention.

What is claimed is:

1. A holddown screw assembly adapted for use in a wellhead structure such as a casing head or tubing head having a radial bore extending from the exterior of the wellhead structure to the interior thereof with an innermost bore section of reduced diameter comprising a first smooth bore portion at the inner end of the bore and a first threaded section adjacent thereto, an intermediate smooth bore section of intermediate diameter defining an annular counterbore shoulder at its junction with the first threaded bore section, and an enlarged diameter second threaded section extending from the exterior of the wellhead structure to the intermediate smooth bore section, said holddown screw assembly comprising:

an elongate shaft having a projecting tenon at one end and a longitudinal passage extending from the outer end of the shaft to a cross passage in said projecting tenon which opens at the side walls thereof;

a packing nut disposed in sleeved relation about said shaft;

means for mounting the packing nut adjacent the outer end of the shaft to provide for rotary movement of the shaft within the packing nut while precluding the packing nut from relative axial movement with respect to said shaft, said packing nut being provided with external threads whereby it is adapted to be threaded into the second threaded section of said radial bore to energize a packing ring assembly when the packing rings are disposed in sleeved relation about said elongate shaft by compressing the packing ring assembly against said counterbore shoulder;

an energizer screw having an externally threaded enlarged diameter section of a diameter to be threadedly received within the first threaded section of said radial bore, said screw having a slotted recess formed in one end thereof and of a dimension to receive the projecting tenon of said shaft therein, said energizer screw having a first reduced diameter section providing an annular bearing shoulder facing towards the end thereof which is remote from the slotted end, a second intermediate diameter section between said first reduced diameter section and said enlarged diameter section which with the cylindrical wall of said radial bore forms an annular chamber between, and passage means extending through the enlarged diameter section of the energizer screw from the slotted outer end therof;

a contact nose element having a bearing surface at one end and a camming surface at the other end thereof;

means for mounting the contact nose element on the end of the energizer screw remote from the slotted end thereof whereby the contact nose is adapted for limited axial movement and relative rotary movement with respect to said energizer screw with said bearing surface of the contact nose disposed towards said annular bearing shoulder of the energizer screw and adapted to bear against said bearing shoulder if the energizer screw is threadedly advanced towards the interior of the wellhead structure;

seal means provided circumferentially about the contact nose for establishing a fluid-tight seal between the contact nose and first smooth bore portion of the radial bore;

a fitting affixed to the outer end of said shaft for accommodating its connection to a hydraulic pressure line whereby pressurized fluid may be delivered through the passages provided in the shaft and the passage means of the energizer screw into said annular chamber formed about the intermediate diameter section of the energizer screw whereby the contact nose is adapted to be driven by hydraulic pressure into camming engagement with a wellhead component mounted in said wellhead structure for applying a loading force theron, said shaft and energizer screw being coaxially aligned within said radial bore.

2. A holddown screw as recited in claim 1 further including an annular packing assembly sleeved about said shaft in abutting engagement with said packing nut on the side thereof which faces the contact nose.

3. A holddown screw as recited in claim 1 wherein said bearing surface at one end of the contact nose is a planar surface disposed radially to its longitudinal axis and said camming surface is a bevelled planar surface.

* * * * *